May 24, 1949.  J. F. FLETCHER  2,471,028
SIREN

Filed Dec. 5, 1945  3 Sheets-Sheet 1

Inventor
John Floyd Fletcher
By
Attorney

May 24, 1949. J. F. FLETCHER 2,471,028
SIREN
Filed Dec. 5, 1945 3 Sheets-Sheet 2
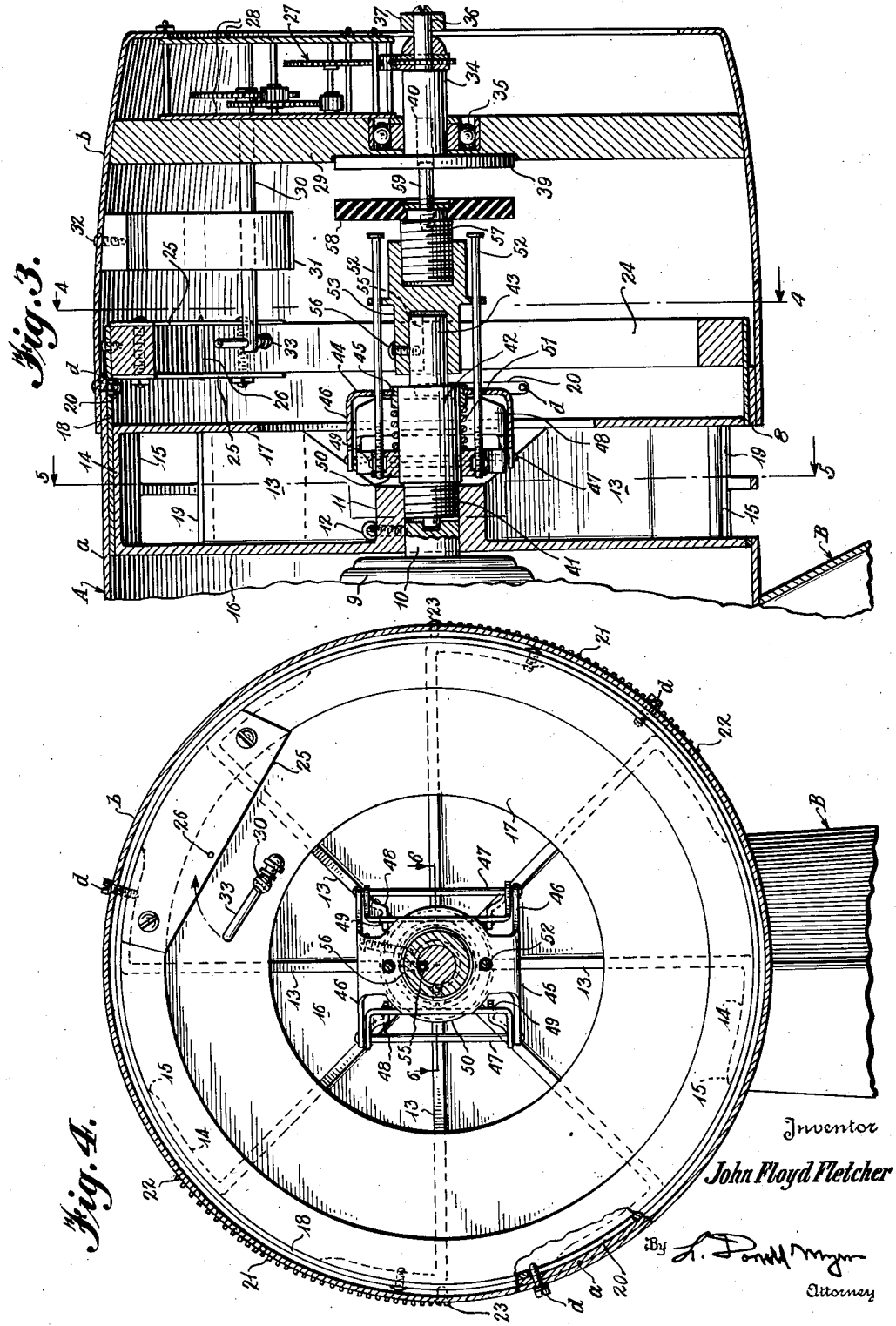

May 24, 1949.  J. F. FLETCHER  2,471,028
SIREN
Filed Dec. 5, 1945  3 Sheets-Sheet 3
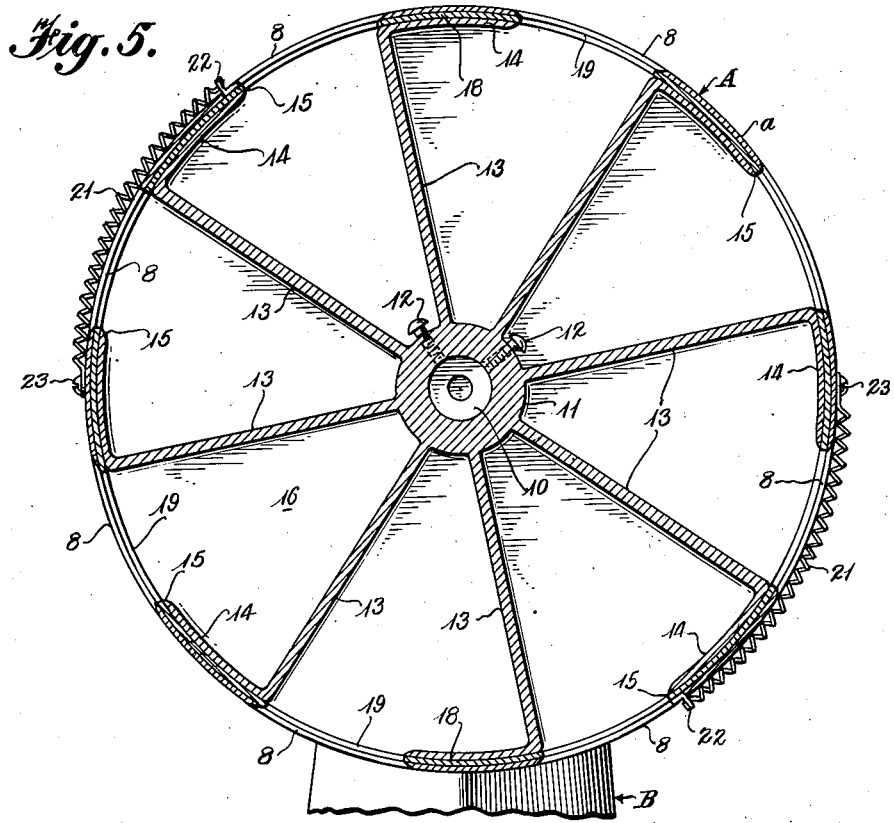
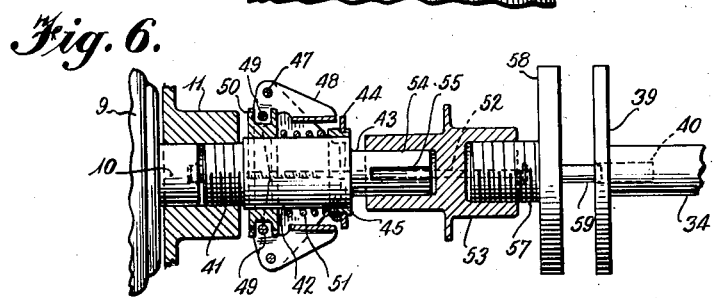
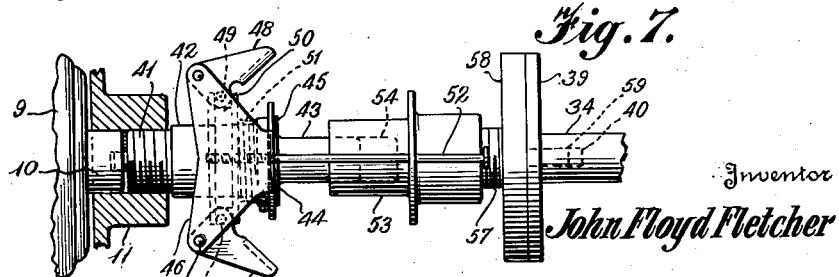
Inventor
John Floyd Fletcher
By
Attorney Patented May 24, 1949

2,471,028

UNITED STATES PATENT OFFICE 2,471,028

SIREN

John Floyd Fletcher, Cleveland, Miss.

Application December 5, 1945, Serial No. 632,886

6 Claims. (Cl. 116—147)

This invention relates to the automatic and self-operated mechanism to be attached to a siren, which shuts off and on the sound of the siren, at high speeds only, and has as its object the improvement and the making more effective of the sound of a siren, by interrupting the sound intermittently, thereby creating a more noticeable and exciting and effective warning signal by breaking the monotony of the long continued rise and fall of the ordinary siren sound and by producing a new siren sound that is more noticeable and more effective as a warning signal.

An ordinary siren is operated by a control switch, by engaging which the operator can set in motion the action of the siren, and, when the rising sound of the siren has reached the desired peak or pitch the switch may be disengaged, thereby creating a falling sound, and this action is repeated by the operator to create continued rising and falling sound of the siren. When a siren attains its maximum speed, which is generally about 4500 R. P. M., its sound becomes so shrill, high-pitched and monotonous that it becomes less audible, and a large percentage of its effectiveness as a warning device is lost.

This invention does not affect in any way, the use and operation of a siren at low or medium speeds, but is activated by a centrifugal clutch which is designed to engage at approximately 3500 R. P. M., which is slightly above medium speed of a siren. When the clutch is engaged it sets in motion a set of reduction gears, which reduces the siren speed of 4500 R. P. M. to 83 R. P. M. on another shaft. This shaft operates a sleeve that is located between the siren bell and bell housing in such a manner as to cut off, temporarily, the sound of the siren by closing the sound ports of the siren bell housing, which, without this invention remain open at all times. When the sound ports are completely closed by the sleeve, the sleeve is released by being disengaged from the shaft, and is snapped back to the open position by spring action, permitting again the sound of the siren to issue. The sleeve being operated by the shaft opens and closes on each revolution of the shaft, or at the rate of 83 times per minute.

Other objects and advantages of the invention will be apparent during the course of the following description.

Figure 1:
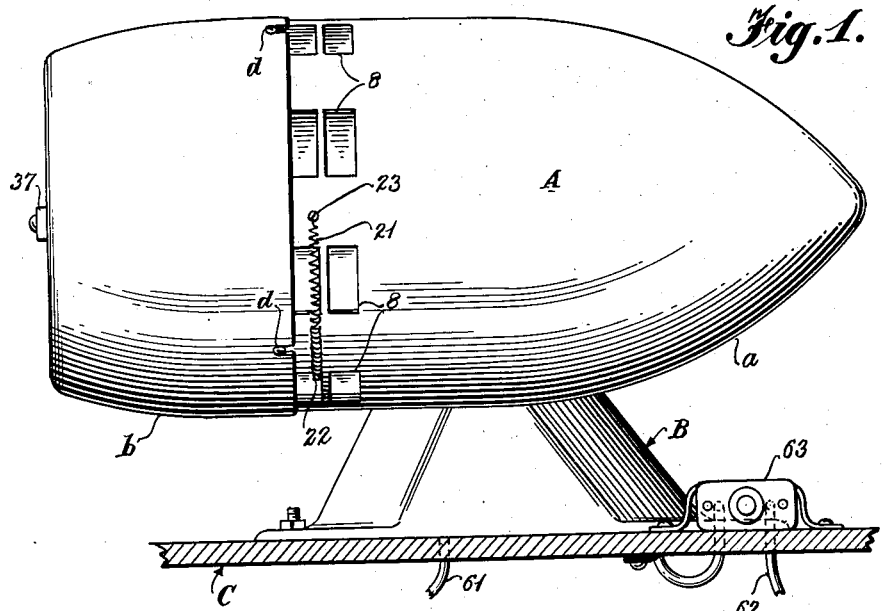
Figure 2:
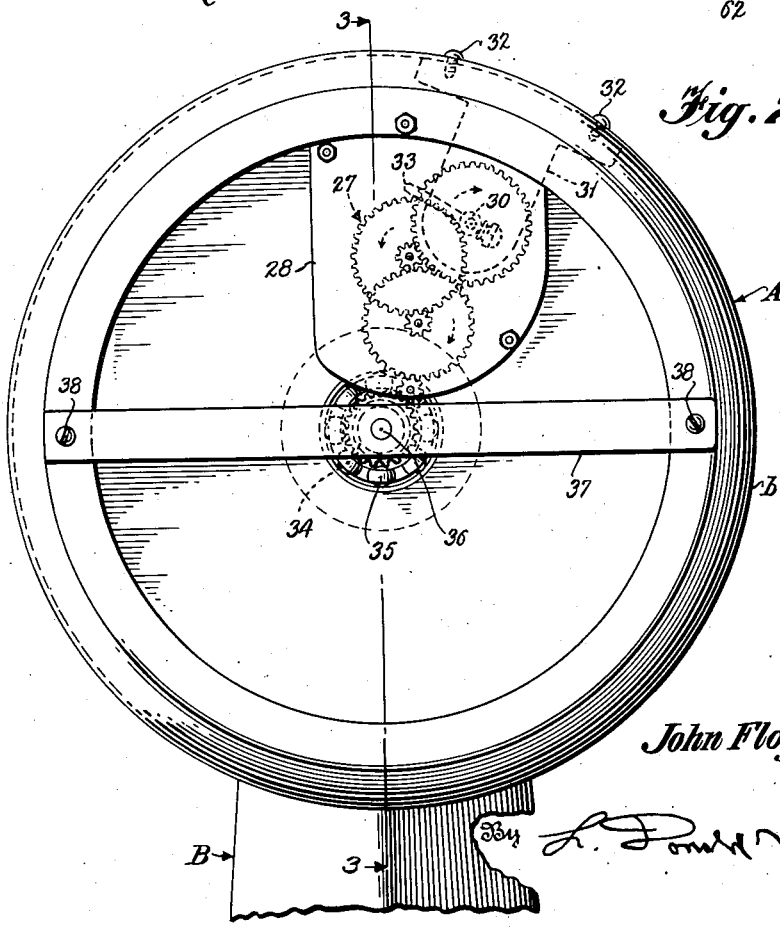

In the accompanying drawings forming a part of this specification and in which like numerals are employed to designate like parts throughout the same, Figure 1 is a side elevational view of a siren embodying this invention, Figure 2 is a front end elevational view of the siren of Fig. 1, Figure 3 is a fragmentary vertical sectional view taken on line 3—3 of Fig. 2, Figure 4 is a transverse sectional view taken on line 4—4 of Fig. 3, Figure 5 is a transverse vertical sectional view taken on line 5—5 of Fig. 3, Figure 6 is a detail vertical sectional view taken on line 6—6 of Fig. 4, and illustrating a centrifugally actuated clutch that forms a part of a drive mechanism in its disengaged condition, and Figure 7 is a detail side elevational view of the mechanism illustrated in Fig. 6 but showing the clutch properly engaged.

In the drawings, wherein for the purpose of illustration is shown the preferred embodiment of this invention, and first particularly referring to Fig. 1, the reference character A designates the main body portion of a conventional, electrically actuated siren which, when energized and operating at top speed, is adapted to produce the conventional shrill, high-pitched sound. Most everyone is familiar with the sound produced by sirens employed on municipal fire fighting apparatus and ambulances and has noticed that it rises and falls during each period of operation. This variation in sound is produced by the rotor portion of the siren coming up to the relatively high speed of about 4500 R. P. M., after the circuit to the electric driving motor is closed, and by the rotor coasting down to a stationary position, after the circuit to the electric motor is broken. While the rotor of the siren is operating, the sound produced by the siren is continuous.

To provide a variation in the sound produced by such a conventional siren, it is the practice of the operator to periodically make and break the electric circuit of the siren motor, so that the sound will rise and fall and will not continue, for a prolonged period of time, at the single shrill, high-pitched note that results from operation of the motor only at its top speed. This practice of repeatedly making and breaking the circuit of the siren motor, obviously, requires the attention of one of the occupants of the emergency vehicle that is equipped with the siren. If the driver of the vehicle is controlling the operation of the siren, periodic manipulation of the control switch for the siren, obviously, prevents him from devoting all of his attention and efforts to the guiding of the vehicle through traffic.

The main body A of the siren is provided with a base or standard B that is employed for mounting the unit on a suitable supporting portion C of the vehicle. The housing of the main body portion A of the siren includes a rear portion $a$, directly attached to the base or standard B, and a front end cap or cover $b$. These two housing parts are detachably connected by the screws $d$.

The front end of the housing part $a$ is provided with an annular series of ports or openings 8 through which air under pressure is discharged to produce the siren sound. These ports or openings are clearly shown in Figs. 1 and 5. In this particular form of siren, there are eight such discharge ports. It is to be understood, however, that a greater or lesser number of discharge ports can be employed without in any way affecting the invention.

The housing part $a$ of the siren body has suitably mounted therein an electric motor, not shown. Figs. 3, 6 and 7 illustrate a bearing structure 9 that is employed for supporting the power output end 10 of the armature shaft of the motor.

Figs. 3, 5, 6 and 7 disclose the hub portion 11 of an impeller mounted on the end 10 of the armature shaft and held thereon by the set screws 12. The impeller further includes a series of eight radial blades 13 which are formed with circumferentially extending vanes 14 at their outer edges. These vanes are of proper dimensions circumferentially to leave openings 15 between their free edges and the portions of the next adjacent impeller blades 13. These openings 15 are arranged in alignment with and correspond in size and shape with the discharge ports 8 that are formed in the housing part $a$ of the siren body. It will be appreciated that during each complete revolution of the impeller, the eight vanes 14 will alternately register with, and thereby close, the discharge ports 8 formed in the housing part $a$ and will alternately register radially with the portions of the housing part $a$ that are located between the discharge ports 8. Consequently, each one of the ports 8 will be closed eight times and opened eight times during each complete revolution of the rotor. This alternate opening and closing of the discharge ports 8 functions to produce the siren sound as air under pressure is expelled or discharged through the opened ports.

To bring about circulation of the air under pressure, the inner side of the impeller is completely closed by a wall 16 while the outer side of the impeller is partially closed by the annular wall 17. This annular wall is left open at its center to admit air to the impeller blades 13.

Figs. 3, 4 and 5 disclose a control sleeve 18 that is interposed between the periphery of the impeller and the portion of the siren housing part $a$ that is provided with the air discharge ports 8. This control sleeve 18 is formed with openings 19 that are circumferentially spaced the same distance as and are shaped the same as the ports 8 of the housing part $a$ and the openings 15 formed in the periphery of the impeller. Therefore, when the openings 19 of the control sleeve register with the discharge ports 8 of the siren housing part $a$, the air under pressure developed by the impeller blades will be discharged through the ports 8. This condition of alignment is illustrated in Fig. 5. It will be understood, however, that if the control sleeve 18 is moved angularly a proper distance, the solid portions of the control sleeve will close the discharge ports 8 of the siren housing part $a$. When these discharge ports 8 are closed, the air placed in circulation under pressure by the impeller will not be permitted to discharge through the ports 8 and no sound will be produced. It is intended, therefore, that the control sleeve be actuated so that it will be oscillated back and forth into and out of position for alternately closing and opening the discharge ports 8 to bring about intermittent interruption in the production of the siren sound which, otherwise, would be continuous.

The control sleeve 18 is provided with a suitable number of circumferentially extending and spaced slots 20 which are adapted to accommodate the previously referred to screws $d$ employed for fastening the housing cap $b$ to the main part $a$ of the siren housing. These screws $d$ and their cooperating slots 20 function to limit the extent to which the control sleeve 18 is permitted to move angularly in either direction.

Figs. 1, 4 and 5 disclose springs 21 which are employed for yieldably holding the control sleeve 18 in its position for uncovering the discharge ports 8 and for returning the control sleeve to that position after it has been moved to close the discharge ports. One end of each spring 21, therefore, is connected to an ear 22 that projects radially, outwardly of the control sleeve 18 while the other end of each spring is anchored to the housing part $a$ by a screw 23.

The mechanism employed for intermittently, angularly moving the control sleeve against the tension of the springs 21, now will be described. It is to be understood that this drive mechanism is intended to move the control sleeve at a greatly reduced frequency relative to the speed of rotation of the impeller. It has been determined that an actuation frequency of 83 times per minute with a rotor speed of 4500 R. P. M. produces the desired results. Also, although the invention is not necessarily so limited, it is my intention that the control sleeve only be actuated during the periods when the rotor is operating at a speed equal to or in excess of approximately 3500 R. P. M.

The said drive mechanism includes a ring 24 that is suitably attached to and is positioned within the outer end portion of the control sleeve 18. This ring 24 has fastened to its opposite radial faces the plates 25. These plates are employed for supporting a pin 26 that is spaced radially inwardly of the inner face of the ring 24. Figs. 3 and 4 clearly illustrate this mechanism.

A speed reducing gear set 27 is carried by face plates 28 that are suitably fastened to the housing cap part $b$ by means of the partition 29. The power output shaft 30 of this gear set projects inwardly of the partition 29 and is further supported by the bearing bracket 31 that is suitably fastened to the inner face of the siren housing cap $b$, as by means of the screws 32. This power output shaft 30, which will rotate at a speed of approximately 83 R. P. M., is provided with a laterally projecting pin 33 that is positioned to engage the pin 26 attached to the control sleeve 18. In other words, the pin 33 will engage the pin 26 at a frequency of approximately 83 times per minute and each time these two pins are engaged, the control sleeve 18 will be moved from its normal or idle position of Figs. 4 and 5 into its active position where it will close the circular series of air discharge ports 8 formed in the siren housing wall.

The power input shaft 34 of the speed reducing gear set 27 is journaled in a suitable anti-friction bearing 35 at its inner end and has a reduced outer end 36 that is supported and guided by a transverse brace 37 shown in Fig. 2 as being supported at its opposite ends by the bolts 38 which fasten said ends to the margin of the siren housing cap b.

The inner end of the power input shaft 34 has a friction clutch plate 39 fastened thereto. This clutch plate is adapted to be rotated only. That is to say, it does not partake of axial movement to effect engagement or disengagement of the clutch. The power input shaft 34 is axially counterbored at 40 for a purpose that will be disclosed at a later point.

Returning again to the hub 11 of the impeller, it will be noted that its bore has threaded therein the end 41 of a stub shaft that includes the slightly enlarged, smooth surfaced body portion 42 and the slightly reduced opposite end portion 43. This stub shaft 41—42—43, therefore, rotates with the hub 11 of the impeller.

A double-winged bracket 44 is fastened to the outer end portion of the smooth surfaced intermediate part 42 of the stub shaft by means of a mounting ring 45. Each one of the wings 46 of the bracket 44 has passing therethrough the mounting pins 47 of the two centrifugally actuated weights 48. These weights are adapted to be moved from the position illustrated in Figs. 3, 4 and 6 into the position illustrated in Fig. 7 whenever the speed of the stub shaft 41—42—43 equals approximately 3500 R. P. M.

The centrifugally actuated weights 48 are provided with pins 49, see particularly Figs. 6 and 7, which are engaged in the grooved periphery of a shifting collar 50 adapted to slide axially of the smooth surfaced portion 42 of the stub shaft. Slidable movement of this shiftable collar 50 is yieldably resisted by means of the spring 51 that surrounds the part 42 of the stub shaft.

The shiftable collar 50 is provided with two rods 52 that are arranged on diametrically opposite sides of the said stub shaft and project beyond the outer extremity of the reduced portion 43 of the stub shaft.

These rods have their outer end portions anchored to an axially shiftable clutch hub 53 provided with a socket 54 at one end that slidably receives the reduced outer end portion 43 of the stub shaft. This reduced shaft portion is provided with a groove 55 that slidably receives the pin or screw 56 carried by the clutch hub 53. Consequently, every time the centrifugally actuated weights 48 are thrown outwardly, they move the shiftable collar 50 axially of the smooth intermediate portion 42 of the stub shaft and this movement of the collar 50, through the medium of the two rods 52, effects axial shifting movement of the clutch hub 53 relative to the stub shaft portion 43.

The clutch hub 53 has threaded in its outer end the shank 57 of the shiftable clutch plate 58. This clutch plate 58 may be formed of any suitable friction material that is capable of driving the clutch plate 39 of the speed reducer gear set 27. It is to be understood that every time the centrifugally actuated weights 48 are thrown outwardly, by the speed of rotation of the stub shaft 41—42—43, the shiftable clutch plate 58 will be moved into driving engagement with the face of the gear train clutch plate 39.

To assure proper axial alignment of these two clutch plates 58 and 39, a centering pin 59 projects axially of the clutch plate 58 and its shank 57 and is slidably received in the bore 40 of the power input shaft 34.

It will be appreciated from the above description of the mechanism for driving the control sleeve 18 that this sleeve will be intermittently actuated to close the air discharge ports 8 of the siren housing part a at a slow frequency relative to the speed of rotation of the impeller and that the control sleeve 18 only will be actuated when the impeller speed equals and exceeds approximately 3500 R. P. M. Of course, it will be appreciated that if the electric motor of the siren is not permitted to accelerate to the speed at which the centrifugally actuated weights 48 are thrown outwardly before the circuit for the siren motor is broken, the siren can be operated without having the control sleeve 18 function to intermittently interrupt the production of the conventional siren sound.

Fig. 1 discloses the two circuit wires 61 and 62 for supplying current to the electric motor of the siren. Any suitable form of circuit making and breaking switch 63 may be connected in series in either one of these circuit wires 61 or 62.

I claim:

1. In a siren, the combination with a housing having a plurality of spaced discharge ports formed in a wall thereof, and power driven rotatable means for circulating air under pressure in the housing and for expelling the air through said discharge ports at rapidly recurring intervals to produce the usual continuous siren sound, of a control member associated with said discharge ports and adapted to be moved into different positions for alternately opening and closing said ports to intermittently interrupt said continuous siren sound, and drive means operated by said power driven rotatable means for moving said control member into said different positions at a frequency that is substantially lower than that of the rotatable means.

2. In a siren, the combination with a housing having a plurality of spaced discharge ports formed in a wall thereof, and power driven rotatable means for circulating air under pressure in the housing and for expelling the air through said discharge ports at rapidly recurring intervals to produce the usual continuous siren sound, of a control member associated with said discharge ports and adapted to be moved into different positions for alternately opening and closing said ports to intermittently interrup said continuous siren sound, and drive means operated by said power driven rotatable means for moving said control member into said different positions at a frequency that is substantially lower than that of the rotatable means, said drive means including a normally disengaged clutch assembly, and centrifugally actuated means rotated by said power driven rotatable means and operable to engage said clutch assembly only when said rotatable means is rotating in excess of a predetermined speed.

3. In a siren, the combination with a housing having an annular series of spaced discharge ports formed in a wall thereof, a power driven impeller in the housing for circulating air under pressure and expelling it through said discharge ports at rapidly recurring intervals to produce the usual continuous siren sound, of a control sleeve angularly movable in opposite directions in the housing radially inwardly of and having an annular series of discharge ports spaced to register with the housing discharge ports, the movements of the control sleeve in opposite directions effecting alternate aligning and disaligning of the two series of discharge ports for intermittently interrupting said continuous siren sound, and drive means operated by said impeller for moving the control sleeve at a frequency that is substantially lower than that of the impeller.

4. In a siren, the combination with a housing having an annular series of spaced discharge ports formed in a wall thereof, a power driven impeller in the housing for circulating air under pressure and expelling it through said discharge ports at rapidly recurring intervals to produce the usual continuous siren sound, of a control sleeve angularly movable in opposite directions in the housing radially inwardly of and having an annular series of discharge ports spaced to register with the housing discharge ports, the movements of the control sleeve in opposite directions effecting alternate aligning and disaligning of the two series of discharge ports for intermittently interrupting said continuous siren sound, and drive means operated by said impeller for moving the control sleeve at a frequency that is substantially lower than that of the impeller, said drive means including a normally disengaged clutch assembly, and centrifugally actuated means rotated by said impeller and operable to engage said clutch assembly only when said impeller is rotating in excess of a predetermined speed.

5. In a siren, the combination with a housing having a plurality of spaced discharge ports formed in a wall thereof, and power driven rotatable means for circulating air under pressure in the housing and for expelling the air through said discharge ports at rapidly recurring intervals to produce the usual continuous siren sound, of a control member associated with said discharge ports and adapted to be moved into different positions for alternately opening and closing said ports to intermittently interrupt said continuous siren sound, and drive means operated by said power driven rotatable means for moving said control member into said different positions at a frequency that is substantially lower than that of the rotatable means, said drive means including a shiftable clutch member rotating with the power driven rotable means, centrifugally actuated weight means rotating with the rotatable means and operatively connected to the clutch member to shift the latter when the power driven rotatable means is rotating in excess of a predetermined speed, a speed reducing gear set having a driving clutch member engaged by the first mentioned clutch member, when it is shifted, to drive the gear set from the power driven rotatable means, and means at the output end of the gear set for moving the control member.

6. In a siren, the combination with a housing having an annular series of spaced discharge ports formed in a wall thereof, a power driven impeller in the housing for circulating air under pressure and expelling it through said discharge ports at rapidly recurring intervals to produce the usual continuous siren sound, of a control sleeve angularly movable in opposite directions in the housing radially inwardly of and having an annular series of discharge ports spaced to register with the housing discharge ports, the movements of the control sleeve in opposite directions effecting alternate aligning and disaligning of the two series of discharge ports for intermittently interrupting said continuous siren sound, and drive means operated by said impeller for moving the control sleeve at a frequency that is substantially lower than that of the impeller, said drive means including a shiftable clutch member rotatable with the impeller, centrifugally actuated weight means rotating with the impeller and operatively connected to the clutch member to shift the latter when the impeller is rotating in excess of a predetermined speed, a speed reducing gear set having a driving clutch member engaged by the first mentioned clutch member, when it is shifted, to drive the gear set from the impeller, and means at the output end of the gear set for moving the control sleeve.

JOHN FLOYD FLETCHER.

REFERENCES CITED

The following references are of record in the file of this patent:

UNITED STATES PATENTS

| Number | Name | Date |
|---|---|---|
| 1,520,225 | Cosgrave et al. | Dec. 23, 1924 |
| 1,941,324 | Schirmer | Dec. 26, 1933 |
| 1,985,954 | Settegast | Jan. 1, 1935 |
| 2,074,263 | Harris, Jr., et al. | Mar. 16, 1937 |